United States Patent Office 3,145,805
Patented Aug. 25, 1964

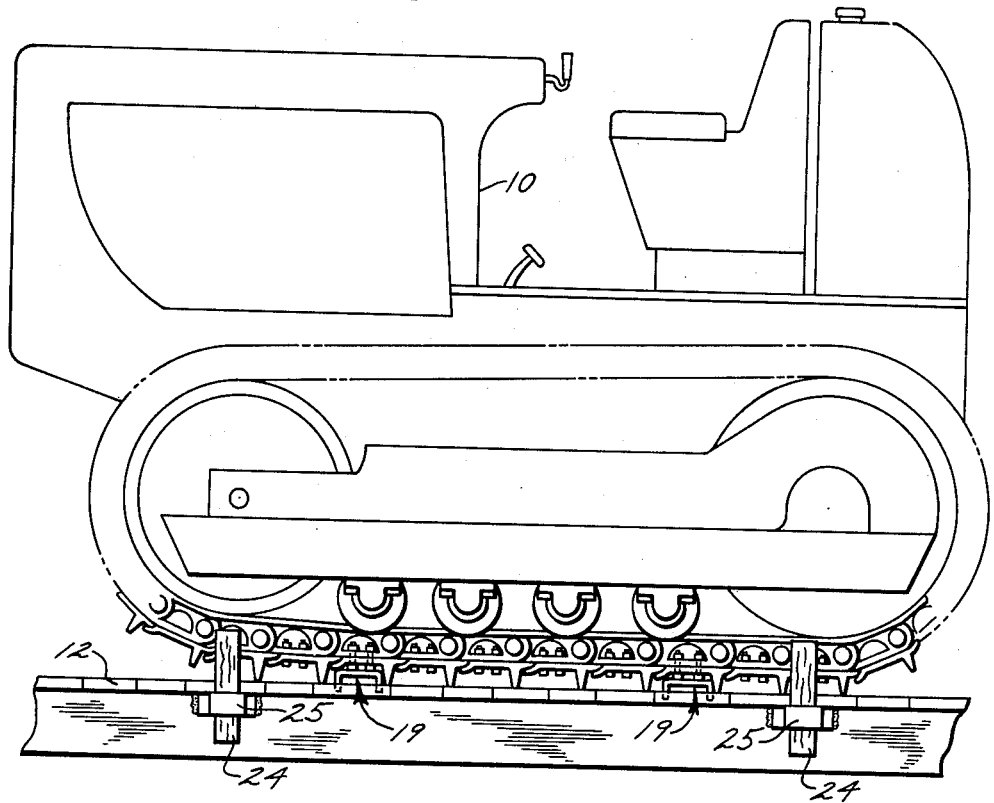
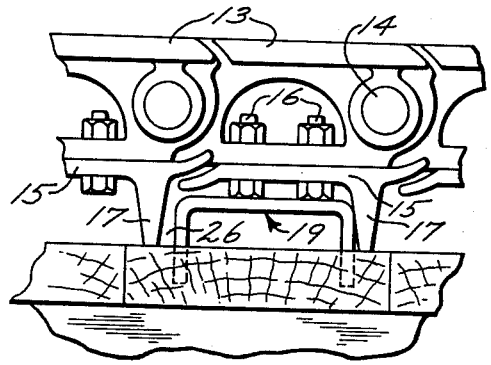
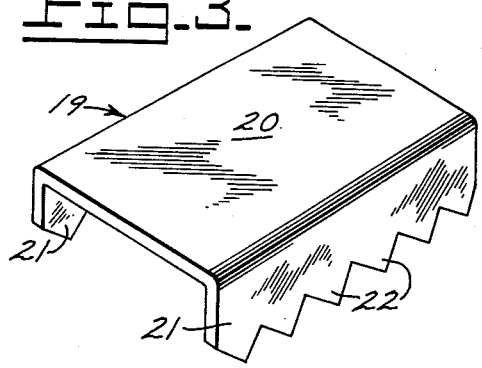

3,145,805
MEANS TO STABILIZE TRACK-TYPE VEHICLES DURING SHIPPING
Edwin J. Kammueller, Lincoln, and Clifford G. Partridge, Morton, Ill., assignors to Caterpillar Tractor Co., Peoria, Ill., a corporation of California
Filed Sept. 24, 1962, Ser. No. 225,539
3 Claims. (Cl. 188—32)

This invention relates to means to stabilize or prevent shifting movement of track-type vehicles during shipment thereof and more particularly to blocking means to prevent movement of heavy track-type machines on the bed of a flat car or in any cargo space.

Track-type machines are usually stabilized in shipment by wood blocks or wedges nailed to the cargo bed in front of and behind the tracks to prevent fore and aft movement. Conventional stakes are placed in sockets provided for their reception along both edges of the car to prevent lateral shifting. These wood blocks and the labor required to install them are costly and undependable and frequently have to be adjusted or replaced in transit. They also have the disadvantage that they are sloped or inclined to conform to the upward curve of the tracks as they pass upwardly over the sprocket and idler of the machine. Thus on severe shock or humping of a flat car, the machine tends to climb up the sloping surfaces of the blocks.

It is, therefore, the object of the present invention to provide a low cost and easily installed stabilizing means to prevent fore and aft movement of track-type vehicles during their shipment and to overcome the above recited and other disadvantages.

It is also an object of the invention to provide a stabilizing or blocking means of the kind described which may be installed without nailing or spiking so as to greatly reduce the cost of labor and also to provide such a means capable of repeated use.

Further objects and advantages of the invention are made apparent in the following specification wherein reference is made to the accompanying drawing.

In the drawing:

FIG. 1 is a view in side elevation of a tractor mounted on the bed of a flat car and stabilized thereon by means embodying the present invention;

FIG. 2 is an enlarged fragmentary view in side elevation showing the relationship of the present invention to the track of a vehicle in use; and FIG. 3 is a perspective view of a block or stabilizer member embodying the present invention.

A tractor indicated at 10 in the drawing is illustrated as resting upon the bed 12 of a flat car or other floor of any cargo space. The tractor tracks comprise, as best illustrated in FIG. 2, a plurality of track links 13 articulately connected as by track pins 14 and each carrying a track shoe 15 secured thereto as by bolts 16. The track shoes 15 are formed with grousers 17 and the heads of the bolts 16 project into the spaces existing between adjacent grousers.

The present invention comprises a stabilizer or blocking member generally indicated at 19 which is of channel shaped configuration as best illustrated in FIG. 3 comprising a web portion 20 and two leg portions 21 depending from the edges of the web. The edges of the leg portions are serrated or formed with spaced pointed teeth 22 so that upon the application of a downward force they penetrate or become imbedded in the wood planking which forms the bed of a flat car.

In use, at least two such blocks are placed on the cargo floor or bed for each track of a track-type machine and spaced apart a distance as shown in FIG. 1 to register with spaces between the grousers of the track. The tractor is then driven into the position shown in FIG. 1 and since the legs of the channel-shaped block 19 are somewhat longer than the space between the ends of the grousers 17 and the heads of the bolt 16, the weight of the tractor is imposed upon the block to cause the teeth 22 thereof to be imbedded in the planking. The hand brakes of the machine are then set and the blocks 19 prevent forward or rearward shifting of the machine on the bed. Conventional side stakes as shown at 24 are placed in sockets 25 provided for their reception to prevent sidewise shifting. The width of the web 20 is preferably somewhat smaller than the space between adjacent grousers 17 leaving, as shown in FIG. 2, a space 26, the purpose of which is to permit slight shifting of the machine so that it will settle and distribute its weight equally throughout the entire length of the track.

Since the blocks 19 are made of durable metal, they may be used repeatedly and are not destroyed as are wooden blocks upon repeated application of nails or spikes thereto. Furthermore even though the blocks are only a fraction of the size of the wood blocking ordinarily used, the legs 21 present vertical walls adjacent the nearly vertical walls of the track grousers 17 so that shocks imparted in humping cars does not cause the grousers to ride upwardly over the blocking means.

We claim:

1. A shipping stabilizer for a track-type machine having track shoes with grousers thereon comprising a rectangular metal blocking member adapted to fit between and slightly narrower than the space between adjacent track grousers of the machine, and pointed members on the bottom of said member to be imbedded in the surface of the material upon which the machine rests when the weight of the machine is imposed thereon.

2. The combination of claim 1 in which the blocking member is of channel-shaped cross section with serrated edges on the legs of the channel.

3. The combination of claim 2 in which the legs of the channel are longer than the space between the surface upon which the grousers rest and bolts which secure the track shoes in place to insure that the weight of the machine is imposed on the serrated edges.

References Cited in the file of this patent
UNITED STATES PATENTS
2,332,993   Davis _____ Oct. 26, 1943
2,906,212   Hayes _____ Sept. 29, 1959